United States Patent
Yu et al.

(10) Patent No.: US 11,853,056 B2
(45) Date of Patent: Dec. 26, 2023

(54) REMOTE CONTROL METHOD AND REMOTE CONTROL APPARATUS FOR AUTONOMOUS VEHICLE

(71) Applicant: APOLLO INTELLIGENT DRIVING TECHNOLOGY (BEIJING) CO., LTD., Beijing (CN)

(72) Inventors: Gao Yu, Beijing (CN); Jingjing Xue, Beijing (CN); Shi Hu, Beijing (CN)

(73) Assignee: APOLLO INTELLIGENT DRIVING TECHNOLOGY (BEIJING) CO., LTD.

( * ) Notice: Subject to any disclaimer, the term of this patent is extended or adjusted under 35 U.S.C. 154(b) by 408 days.

(21) Appl. No.: 17/124,977

(22) Filed: Dec. 17, 2020

(65) Prior Publication Data

US 2021/0103278 A1 Apr. 8, 2021

Related U.S. Application Data

(63) Continuation of application No. PCT/CN2019/113302, filed on Oct. 25, 2019.

(30) Foreign Application Priority Data

Jan. 15, 2019 (CN) .......................... 201910035563.7

(51) Int. Cl.
*G05D 1/00* (2006.01)
*B60W 10/20* (2006.01)
(Continued)

(52) U.S. Cl.
CPC ........... *G05D 1/0044* (2013.01); *B60W 10/20* (2013.01); *B60W 40/02* (2013.01); *B60W 40/08* (2013.01);
(Continued)

(58) Field of Classification Search
CPC ........ G05D 1/0044; G05D 2201/0213; B60W 10/20; B60W 40/02; B60W 40/08; B60W 2540/049
See application file for complete search history.

(56) References Cited

U.S. PATENT DOCUMENTS

2013/0345919 A1 12/2013 Mach et al.
2017/0192426 A1* 7/2017 Rust .................. B60W 30/00
(Continued)

FOREIGN PATENT DOCUMENTS

CN 106153352 A 11/2016
CN 106394545 A 2/2017
(Continued)

OTHER PUBLICATIONS

International Search Report is PCT/CN2019/113302 dated Jan. 22, 2020.
(Continued)

*Primary Examiner* — Hussein Elchanti
(74) *Attorney, Agent, or Firm* — Dilworth IP, LLC

(57) ABSTRACT

A remote control method for an autonomous vehicle includes: a central control device receives a remote control request message sent by a vehicle; detects a driving operation of a control person on the simulated cockpit; generates an instruction for simulating a driving operation according to the driving operation of a control person on the simulated cockpit, where the instruction for simulating a driving operation is used to simulate the driving operation of the control person on the simulated cockpit; and sends a remote control message to the vehicle. A remote control apparatus for an autonomous vehicle is also related.

15 Claims, 5 Drawing Sheets

(51) Int. Cl.
*B60W 40/02* (2006.01)
*B60W 40/08* (2012.01)
(52) U.S. Cl.
CPC ............... *B60W 2540/049* (2020.02); *G05D 2201/0213* (2013.01)

(56) References Cited

U.S. PATENT DOCUMENTS

| | | | | |
|---|---|---|---|---|
| 2017/0277181 | A1* | 9/2017 | Fairfield | G05D 1/0033 |
| 2017/0357259 | A1* | 12/2017 | Foster | G05D 1/021 |
| 2018/0050699 | A1 | 2/2018 | Gauthier | |
| 2018/0231982 | A1* | 8/2018 | Yunoki | G05D 1/0282 |
| 2019/0001836 | A1* | 1/2019 | Payne | B60W 10/20 |
| 2019/0302761 | A1* | 10/2019 | Huang | G05D 1/0221 |

FOREIGN PATENT DOCUMENTS

| | | |
|---|---|---|
| CN | 107117176 A | 9/2017 |
| CN | 107300921 A | 10/2017 |
| CN | 206696701 U | 12/2017 |
| CN | 107589745 A | 1/2018 |
| CN | 108428357 A | 8/2018 |
| CN | 109116720 A | 1/2019 |
| CN | 109808703 A | 5/2019 |

OTHER PUBLICATIONS

First Office Action in CN Patent Application No. 201910035563.7 dated Feb. 3, 2020.
First Office Action in CN Patent Application No. 202110704839.3 dated Jun. 30, 2023.

* cited by examiner

REMOTE CONTROL METHOD AND REMOTE CONTROL APPARATUS FOR AUTONOMOUS VEHICLE

CROSS-REFERENCE TO RELATED APPLICATION

This application is a continuation of International Application No. PCT/CN2019/113302, filed on Oct. 25, 2019, which claims priority to Chinese Patent Application No. 201910035563.7, filed to the China National Intellectual Property Administration on Jan. 15, 2019 and entitled "Remote Control Method and Remote Control Apparatus for Autonomous Vehicle", both of which are hereby incorporated by reference in their entireties.

TECHNICAL FIELD

The present disclosure relates to the field of autonomous vehicles, and in particular, to a remote control method and a remote control apparatus for an autonomous vehicle.

BACKGROUND

An autonomous vehicle is also referred to as a self-driving vehicle, which mainly employs a cooperation of artificial intelligence, computer vision, a radar, a monitoring apparatus, and a navigation and positioning system, combines monocular or multi-lens cameras and uses machine vision technologies, so as to enable the autonomous vehicle to recognize traffic lights, a traffic sign, a lane line, a short-distance low-speed obstacle and the like in real time, and communicate with a road infrastructure and cloud database at the same time, thereby allowing the vehicle to drive on a planned route in accordance with traffic rules.

If an emergency occurs during a driving process of an autonomous vehicle, the autonomous vehicle can send a request message to a remote control server. The control server is configured to control the start of the driving of the driving vehicle, and the control server generates corresponding control instructions according to a preset algorithm, and sends the same to the autonomous vehicle, and thus the autonomous vehicle is controlled according to the control instructions sent by the control server.

SUMMARY

The present disclosure provides a remote control method and a remote control apparatus for an autonomous vehicle.

A first aspect of the present disclosure provides a remote control method for an autonomous vehicle, where the method is applied to a central control device, the central control device is connected with a simulated cockpit, the simulated cockpit includes an operating component provided according to a real vehicle structure, and the method includes:
  receiving a remote control request message sent by a vehicle, the remote control request message being used to request remote control of a vehicle;
  detecting a driving operation of a control person on the simulated cockpit;
  generating an instruction for simulating a driving operation according to the driving operation of a control person on the simulated cockpit, the instruction for simulating a driving operation being used to simulate the driving operation of the control person on the simulated cockpit; and
  sending a remote control message to the vehicle, the remote control message including the instruction for simulating a driving operation.

Optionally, the remote control request message includes vehicle information and environment information of the vehicle, and before detecting the driving operation of the control person on the simulated cockpit, the method further includes:
  outputting the vehicle information and the environment information of the vehicle.

Optionally, the outputting the vehicle information and the environment information of the vehicle includes:
  displaying the vehicle information and the environment information of the vehicle.

Optionally, the vehicle information includes: identifier information of the vehicle, location information of the vehicle, driving status information, and number information of passengers in the vehicle; and
  the environment information of the vehicle includes at least one of the following: weather information and obstacle information.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

A second aspect of the present disclosure provides a remote control method for an autonomous vehicle which includes:
  sending a remote control request message to a central control device when status information of a vehicle meets a preset condition, the remote control request message being used to request remote control of the vehicle;
  receiving a remote control message sent by the central control device, the remote control message including an instruction for simulating a driving operation, the instruction for simulating a driving operation is generated by the central control device according to a driving operation of a control person on a simulated cockpit, and the instruction for simulating a driving operation is used to simulate the driving operation of the control person on the simulated cockpit; and
  controlling an operation of the vehicle according to the instruction for simulating a driving operation.

Optionally, the remote control request message includes vehicle information and environment information of the vehicle.

Optionally, the vehicle information includes: identifier information of the vehicle, location information of the vehicle, driving status information, and number information of passengers in the vehicle; and
  the environment information of the vehicle includes at least one of the following: weather information and obstacle information.

Optionally, before sending the remote control request message to the central control device, the method further includes:
  presenting an input port for the number information of the passengers, and receiving the number information of the passengers in the vehicle, which is inputted by a passenger through the input port for the number information of the passengers, the input port for the information of the number of passengers being an input interface for the number information of the passengers or a voice input port for the number information of the passengers.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

A third aspect of the present disclosure provides a remote control apparatus for an autonomous vehicle, where the apparatus is applied to a central control device, the central control device is connected with a simulated cockpit, the simulated cockpit includes operating components provided according to a real vehicle structure, and the apparatus includes:
- a receiving module, configured to receive a remote control request message sent by a vehicle, where the remote control request message is configured to request remote control of a vehicle;
- a detecting module, configured to detect a driving operation of a control person on the simulated cockpit;
- a generating module, configured to generate an instruction for simulating a driving operation according to the driving operation of a control person on the simulated cockpit, simulating a driving operation, where the instruction for simulating a driving operation is configured to simulate the driving operation of the control person on the simulated cockpit; and
- a sending module, configured to send a remote control message to the vehicle, where the remote control message includes the instruction for simulating a driving operation.

Optionally, the remote control request message includes vehicle information and environment information of the vehicle, and the apparatus further includes:
- an output module, configured to output the vehicle information and the environment information of the vehicle.

Optionally, the output module is specifically configured to:
- display the vehicle information and the environment information of the vehicle.

Optionally, the vehicle information includes: identifier information of the vehicle, location information of the vehicle, driving status information, and umber information of passengers in the vehicle; and
- the environment information of the vehicle includes at least one of the following: weather information and obstacle information.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

A fourth aspect of the present disclosure provides a remote control apparatus for an autonomous vehicle, which includes:
- a sending module, configured to send a remote control request message to a central control device when status information of a vehicle meets a preset condition, where the remote control request message is configured to request remote control of a vehicle;
- a receiving module, configured to receive a remote control message sent by the central control device, where the remote control message includes an instruction for simulating a driving operation, the instruction for simulating a driving operation is generated by the central control device according to a driving operation of a control person on a simulated cockpit, and the instruction for simulating driving operation is configured to simulate the driving operation of the control person on the simulated cockpit; and
- a control module, configured to control an operation of the vehicle according to the instruction for simulating a driving operation.

Optionally, the remote control request message includes vehicle information and environment information of the vehicle.

Optionally, the vehicle information includes: identifier information of the vehicle, location information of the vehicle, driving status information, and number information of passengers in the vehicle; and
- the environment information of the vehicle includes at least one of the following: weather information and obstacle information.

Optionally, the apparatus further includes:
- an output module, configured to present an input port for the number information of the passengers, and receive the number information of the passengers in the vehicle, which is inputted by a passenger through the input port for the number information of the passengers, where the input port for the number information of the passengers is an input interface for the number information of the passengers or a voice input port for the number information of the passengers.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

A fifth aspect of the present disclosure provides a central control device which includes: a processor, a memory and a transceiver, where the memory is configured to store instructions, the transceiver is configured to communicate with other devices, and the processor is configured to execute the instructions stored in the memory to cause the central control device to perform the methods according to the first aspect and each optional manner of the present disclosure.

A sixth aspect of the present disclosure provides an on board device, which includes: a processor, a memory and a transceiver, where the memory is configured to store instructions, the transceiver is configured to communicate with other devices, and the processor is configured to execute the instructions stored in the memory to cause the on board device to perform the methods according to the second aspect and each optional manner of the present disclosure.

A seventh aspect of the present disclosure provides a computer-readable storage medium, where the computer-readable storage medium stores instructions, and the instructions, when executed, cause a computer to perform the method according to the first aspect and each optional manner of the present disclosure.

A eighth aspect of the present disclosure provides a computer-readable storage medium, where the computer-readable storage medium stores instructions, and the instructions, when executed, cause a computer to perform the method according to the second aspect of the present disclosure.

The present disclosure provides a remote control method and a remote control apparatus for an autonomous vehicle, which includes: a central control device receives a remote control request message sent by a vehicle, detects a driving operation of a control person on the simulated cockpit; generates an instruction for simulating a driving operation according to the driving operation of a control person on the simulated cockpit, where the instruction for simulating a driving operation is used to simulate the driving operation of the control person on the simulated cockpit; and sends a remote control message to the vehicle, where the remote control message includes the instruction for simulating a driving operation.

DESCRIPTION OF EMBODIMENTS

In order to make the purpose, technical solutions and advantages of embodiments of the present disclosure clearer, the technical solutions of the embodiments of the present disclosure will be described clearly and completely in combination with the drawings of the embodiments of the present disclosure. Obviously, the described embodiments are part of the embodiments of the present disclosure, rather than all of the embodiments. On the basis of the embodiments of the present disclosure, all other embodiments obtained by those of ordinary skilled in the art without creative labor are within the protection scope of the present disclosure.

Remote controlling a vehicle, especially an autonomous vehicle, is a basic requirement for the safety and efficiency of an intelligent transportation system. In order to realize the remote control of a vehicle, a control server needs to carry out control interaction and information synchronization with the vehicle, and the vehicle also needs to coordinate the control of a driver and the control server.

Figure 1:
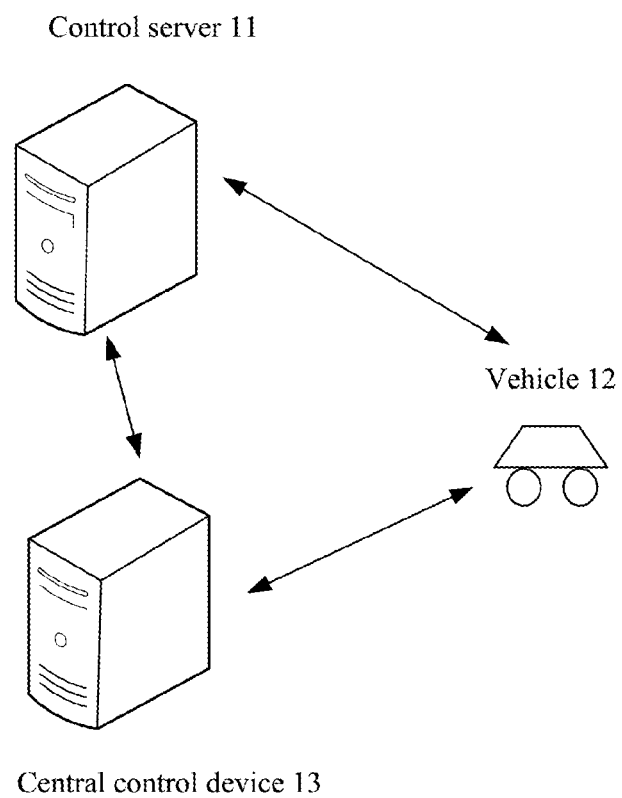
FIG. 1 is a schematic diagram of an intelligent transportation system applicable to the present disclosure.

FIG. 1 is a schematic diagram of an intelligent transportation system applicable to the present disclosure. As shown in FIG. 1, the intelligent transportation system includes a control server 11, a vehicle 12 and a central control device 13. The vehicle 12 is an autonomous vehicle. The control server 11 and the central control device 13 are both connected and communicated with the vehicle 12 in a wireless manner. The central control device 13 and the control server 11 may be connected with each other in wired or wireless manner. The control server is also referred to as a transportation control server. FIG. 1 is only a schematic diagram, and the intelligent transportation system may further include more control servers and vehicles, which are not limited in the present disclosure.

Information of the control server 11 is well-known in the intelligent transportation system, and can be pre-configured or obtained instantly by the vehicle 12. Before participating in a traffic activity, the vehicle 12 sends a registration request message to the control server 11 to apply for establishing a control association between the vehicle 12 and the control server 11. The registration request message contains a unique permanent identifier of the vehicle 12 that does not change during its life cycle.

According to the permanent identifier of the vehicle 12, the control server 11 queries safety and environmental protection inspection, insurance and tax payment, and theft report and other status information thereof. If status of the vehicle 12 meets criteria for participating in a traffic activity, the control server 11 decides to allow the vehicle 12 to register to the intelligent transportation system, and assigns the vehicle 12 a temporary identifier used to identify the vehicle 12 in the intelligent transportation system, and stores the permanent identifier and the temporary identifier of the vehicle 12 in association; otherwise, the control server 11 decides to reject the vehicle 12 to register to the intelligent transportation system.

The control server 11 sends a registration response message to the vehicle 12 to provide a feedback that establishing a control association between the vehicle 12 and the control server 11 is allowed or rejected. If it is allowed, the registration response message contains a success mark and the temporary identifier assigned to the vehicle 12; if it is rejected, the registration response message contains a failure mark.

During the vehicle 12 participating in a traffic activity, messages related to traffic application/service sent between the vehicle 12 and the control server 11 based on the control association includes request-response or one-way notification.

During the vehicle 12 participating in a traffic activity, the control server 11 obtains vehicle information required for management and control according to a preset period or in a temporary trigger manner, where the vehicle information required for management and control includes a vehicle user (user identifier, etc.), a driving mode (automatic driving/semi-automatic driving/manual driving, etc.), a use mode (private use/rental, dedicated/shared, etc.), a right-of-way level (emergency vehicle/public vehicle/ordinary vehicle, etc.), operating status (position, direction, speed, acceleration, angular velocity, etc.), operating status (light setting, driver operation, etc.), status of component (a control component, a sensor component, a display component, etc.), external perception (other traffic participant information, traffic environment information, etc.) and the like. The information is denoted by vehicle parameter identifiers and is informed actively by the vehicle 12 to the control server 11. Or, after the control server 11 requests the vehicle 12 and the vehicle 12 responds and feeds back to the control server 11, and the information is stored in association with the temporary identifier of the vehicle 12.

Normal driving of the vehicle 12 is controlled by the control server 12. When the vehicle 12 has a situation that the control server 12 cannot handle, the central control device 13 handles the situation.

Figure 2:
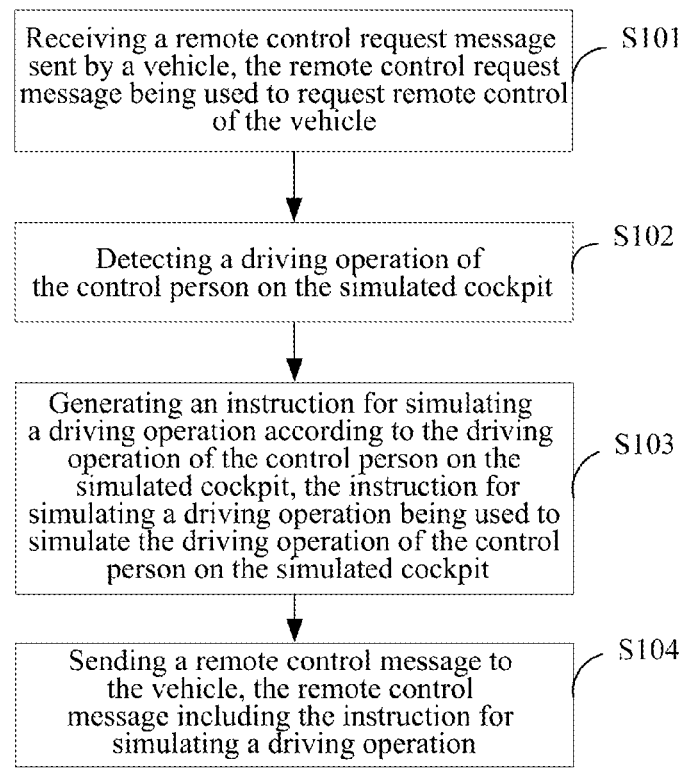
FIG. 2 is a flowchart of a remote control method for an autonomous vehicle provided in Embodiment 1 of the present disclosure.

Based on the intelligent transportation system shown in FIG. 1, Embodiment 1 of the present disclosure provides a remote control method for an autonomous vehicle. FIG. 2 is a flowchart of the remote control method for the autonomous vehicle provided in Embodiment 1 of the present disclosure. The method of this embodiment is performed by the central control device which is connected with a simulated cockpit, and the simulated cockpit includes operating components provided according to a real vehicle structure. As shown in FIG. 2, the method according to this embodiment includes the following steps:

step S101: receiving a remote control request message sent by a vehicle, the remote control request message being used to request remote control of the vehicle.

The remote control request is sent by the vehicle when the control server is unable to handle an emergency situation. For example, after the vehicle sends a remote control request message to the control server but does not receive the remote control message sent by the control server within a preset time, the vehicle sends a remote control request message to the central control device. Or, if the vehicle receives the message sent by the control server within a preset time but the message indicates that the control server cannot control the vehicle, the vehicle sends the remote control request message to the central control device. Or, if the vehicle receives the remote control message sent by the control server within a preset time and operates according to control instructions indicated in the remote control message, but there is still no effect, the vehicle sends the remote control request message to the central control device.

The remote control request message includes at least identifier information of the vehicle to inform the central control device which vehicle is to be remotely controlled.

The remote control request can be directly sent by the vehicle to the central control device, or be forwarded by the control server. The vehicle and the central control device communicate with each other directly through a point-to-point manner, which can reduce network delay and make a control behavior more timely. Optionally, in other optional embodiments of the present disclosure, the remote control request message may also be actively sent by the control server to the central control device, when determining that the emergency situation of the vehicle cannot be handled.

After the central control device receives the remote control request message, it is necessary for a control person to operate the simulated cockpit to control the vehicle. Before the control person performs a driving operation on the simulated cockpit, he needs to know the vehicle information and the environment information of the vehicle.

Exemplarily, the control person obtains the vehicle information and the environment information of the vehicle by the following several ways:

First way: the remote control request message includes the vehicle information and the environment information of the vehicle.

The vehicle information includes: identifier information of the vehicle, location information of the vehicle, driving status information, and number information of passengers in the vehicle.

The environment information of the vehicle includes at least one of the following: weather information and obstacle information. During the driving of the vehicle, there may be an obstacle in the front lane, and there is a risk of collision, where the obstacle may be a rock, a leftover, a dead branch and the like. Obstacle information includes information such as size, location, and type of the obstacle.

The weather information includes: weather types, temperature, wind speed, humidity and the like. The weather types include: sunny, overcast, rainy, snowy, cloudy and the like.

Second way: the remote control request message includes a vehicle identifier, and the central control device requests, according to the vehicle identifier, the control server or other devices to obtain the vehicle information and the environment information of the vehicle.

Third way: the control person can also contact a passenger in the vehicle by a telephone, and the passenger describes the vehicle information and the environment information of the vehicle. Optionally, the remote control request message includes a telephone of the passenger in the vehicle. Of course, the remote control request message may not include the telephone of the passenger in the vehicle, and the control person or the central control device may query the telephone of the passenger in the vehicle according to the vehicle identifier.

After obtaining the vehicle information and the environment information of the vehicle, the central control device outputs the vehicle information and the environment information of the vehicle, so that the control person can know the vehicle information and the environment information of the vehicle, and decide to control the vehicle according to the vehicle information and the environment information of the vehicle.

In one way, the central control device can display the vehicle information and the environment information of the vehicle through a display screen. In another way, the central control device broadcasts the vehicle information and the environment information of the vehicle by means of voice. In yet another way, the central control device sends the vehicle information and the environment information of the vehicle to a mobile phone or an intercom device of the control person.

Step S102, detecting a driving operation of the control person on the simulated cockpit.

The simulated cockpit includes operating components provided according to a real vehicle structure, where the operating components include a steering wheel, a gear lever, a brake lever, a clutch pedal, an accelerator pedal and a brake pedal; and a pressure transmitter, a speed sensor and the like are provided on the clutch pedal, the accelerator pedal and the brake pedal, respectively.

The control person determines to control the vehicle according to the vehicle information and the environment information of the vehicle, and then enters the simulated cockpit for a driving operation. The simulated cockpit can convert a driving operation into an electrical signal through a sensor or other devices and send the electrical signal to a processor of the central control device. The central control device converts the electrical signal into the driving operation of the control person.

Step S103: generating an instruction for simulating a driving operation according to the driving operation of the control person on the simulated cockpit, the instruction for simulating a driving operation being used to simulate the driving operation of the control person on the simulated cockpit.

Optionally, the instruction for simulating a driving operation includes one or more of the following instructions: an instruction for rotating a steering wheel, an instruction for turning a steering switch left and right, an instruction for turning a steering switch up and down, an instruction for sequentially turning a wiper switch, an instruction for sequentially turning an ignition switch, an instruction for sequentially rotating a headlight switch, an instruction for stepping on an accelerator pedal, an instruction for stepping on a clutch pedal, an instruction for stepping on a brake pedal, an instruction for pulling up a handbrake, an instruction for pressing a hazard indicator warning light, and an instruction for following and controlling a panel. These are just examples for illustration and do not limit thereto.

Step S104: sending a remote control message to the vehicle, the remote control message including the instruction for simulating a driving operation.

The instruction for simulating a driving operation is sent to the vehicle, the vehicle simulates, according to the instruction for simulating a driving operation, the driving operation of the control person on the simulated cockpit, which is equivalent to manually controlling the vehicle by the control person.

Figure 3:
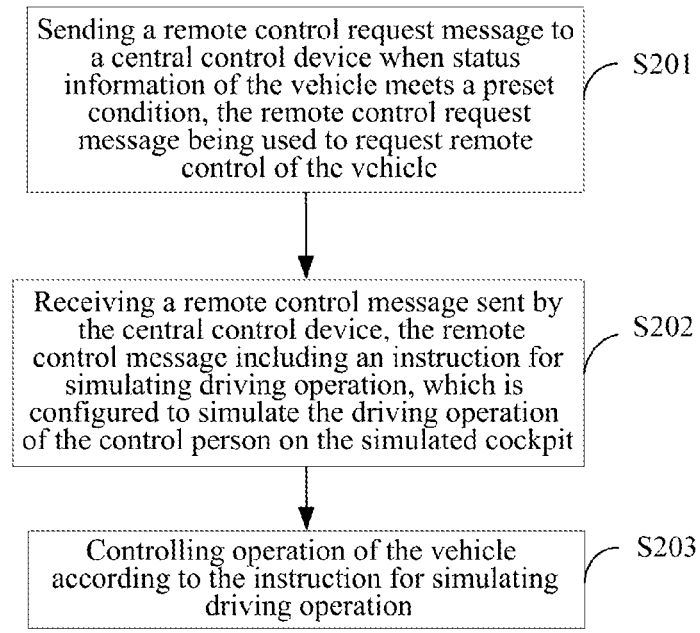
FIG. 3 is a flowchart of a remote control method for an autonomous vehicle provided in Embodiment 2 of the present disclosure.

In this embodiment, the central control device receives the remote control request message sent by the vehicle, detects the driving operation of the control person on the simulated cockpit, and generates, according to the driving operation of the control person on the simulated cockpit, the instruction for simulating a driving operation. The instruction for simulating a driving operation is used to simulate the driving operation of the control person on the simulated cockpit, and the central control device sends to the vehicle the remote control message which includes the instruction for simulating a driving operation. Since the instruction for simulating a driving operation is sent to the vehicle, the vehicle simulates, according to the instruction for simulating a driving operation, the driving operation of the control person on the simulated cockpit, which is equivalent to manually controlling the vehicle by the control person, thereby solving the problem of the autonomous vehicle and passengers in the vehicle being trapped due to an inability of the control server to handle an emergency situation of a vehicle in the prior art. An operator can remotely control the vehicle through the simulated cockpit without going to the scene, thereby saving time and human cost. FIG. 3 is a flowchart of a remote control method for an autonomous vehicle provided in Embodiment 2 of the present disclosure. The method in this embodiment is performed by an on board device in the vehicle, where the on board device may be a trip computer or an on board unit (On Board Unit, OBU for short), etc., and the on board device of the vehicle is used to control the autonomous driving of the vehicle. As shown in FIG. 3, the method according to this embodiment includes the following steps:

Step S201: sending a remote control request message to a central control device when status information of a vehicle meets a preset condition, the remote control request message being used to request remote control of the vehicle.

The preset condition is, for example, that after the vehicle sends a remote control request message to the control server but fails to receive a remote control message sent by the control server within a preset time; or that the message sent by the control server is received within a preset time but the message indicates that the control server cannot control the vehicle; or that the remote control message sent by the control server is received within a preset time and the vehicle has operated according to control instructions indicated in the remote control message, but there is still no effect.

The remote control message at least includes a vehicle identifier. Optionally, the remote control request message includes vehicle information and environment information of the vehicle. The vehicle information includes: identifier information of the vehicle, location information of the vehicle, driving status information, and number information of passengers in the vehicle. The environment information of the vehicle includes at least one of the following: weather information and obstacle information.

Accordingly, before sending the remote control request message to the central control device, the vehicle presents an input port for the number information of the passengers, and then receives the number information of the passengers in the vehicle which is inputted by a passenger through the input port for the number information of the passengers.

The input port for the information of the number of passengers is an input interface for the number information of the passengers or a voice input port for the number information of the passengers. For example, all on board devices have display screens, and thus the display screen of the on board device can display the input interface for the number information of the passengers and prompts the passenger to input the number of passengers.

Step S202: receiving a remote control message sent by the central control device, the remote control message including an instruction for simulating a driving operation which is used to simulate the driving operation of the control person on the simulated cockpit.

The instruction for simulating a driving operation is generated by the central control device according to the driving operation of the control person on the simulated cockpit. The instruction for simulating a driving operation includes one or more of the following instructions: an instruction for rotating a steering wheel, an instruction for turning a steering switch left and right, an instruction for turning a steering switch up and down, an instruction for sequentially turning a wiper switch, an instruction for sequentially turning an ignition switch, an instruction for sequentially rotating a headlight switch, an instruction for stepping on an accelerator pedal, an instruction for stepping on a clutch pedal, an instruction for stepping on a brake pedal, an instruction for pulling up a handbrake, an instruction for pressing a hazard indicator warning light, and an instruction for following and controlling a panel.

Step S203: controlling operation of the vehicle according to the instruction for simulating a driving operation.

In this embodiment, when the status information of the vehicle meets the preset condition, the remote control request message is sent to the central control device, and the remote control message sent by the central control device is received, where the remote control message includes an instruction for simulating a driving operation which is used to simulate the driving operation of the control person on the simulated cockpit, and the operation of the vehicle is controlled according to the instruction for simulating a driving operation. The vehicle simulates, according to the instruction for simulating a driving operation, the driving operation of the control person on the simulated cockpit, which is equivalent to manually controlling the vehicle by the control person, thereby solving the problem of the autonomous vehicle and passengers in the vehicle being trapped due to an inability of the control server to handle an emergency situation of a vehicle in the prior art. An operator can remotely control the vehicle through the simulated cockpit without going to the scene, thereby saving time and human cost.

Figure 4:
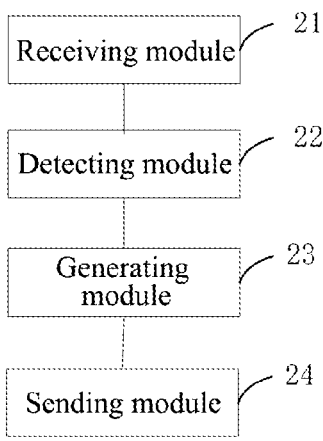
FIG. 4 is a schematic structural diagram of a remote control apparatus for an autonomous vehicle provided in Embodiment 3 of the present disclosure.

FIG. 4 is a schematic structural diagram of a remote control apparatus for an autonomous vehicle provided in Embodiment 3 of the present disclosure. The apparatus provided in this embodiment is applied to a central control device which is connected with a simulated cockpit including operating components provided according to a real vehicle structure. As shown in FIG. 4, the apparatus includes:

a receiving module 21, configured to receive a remote control request message sent by a vehicle, where the remote control request message is configured to request remote control of the vehicle;

a detecting module 22, configured to detect a driving operation of a control person on the simulated cockpit;

a generating module 23, configured to generate, according to the driving operation of the control person on the simulated cockpit, an instruction for simulating a driving operation, where the instruction for simulating a driving operation is configured to simulate the driving operation of the control person on the simulated cockpit; and a sending module 24, configured to send a remote control message to the vehicle, where the remote control message includes the instruction for simulating a driving operation.

Optionally, the remote control request message includes vehicle information and environment information of the vehicle, and the apparatus further includes:

an output module, configured to output the vehicle information and the environment information of the vehicle.

Optionally, the output module is specifically configured to:

display the vehicle information and the environment information of the vehicle.

Optionally, the vehicle information includes: identifier information of the vehicle, location information of the vehicle, driving status information, and number information of passengers in the vehicle; and the environment information of the vehicle includes at least one of the following: weather information and obstacle information.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

The apparatus provided this embodiment can be configured to perform the method in Embodiment 1. The specific implementation and technical effects are similar, and details are not repeated here.

Figure 5:
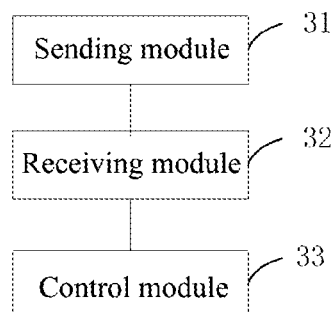
FIG. 5 is a schematic structural diagram of a remote control apparatus for an autonomous vehicle provided in Embodiment 4 of the present disclosure.

FIG. 5 is a schematic structural diagram of a remote control apparatus for an autonomous vehicle provided in Embodiment 4 of the present disclosure. The apparatus provided in this embodiment is applied to an on board device. As shown in FIG. 5, the apparatus includes:

a sending module 31, configured to send a remote control request message to a central control device when status information of a vehicle meets a preset condition, where the remote control request message is configured to request remote control of a vehicle;

a receiving module 32, configured to receive a remote control message sent by the central control device, where the remote control message includes an instruction for simulating a driving operation, the instruction for simulating a driving operation is generated by the central control device according to a driving operation of a control person on a simulated cockpit, and the instruction for simulating a driving operation is configured to simulate the driving operation of the control person on the simulated cockpit; and a control module 33, configured to control an operation of the vehicle according to the instruction for simulating a driving operation.

Optionally, the remote control request message includes vehicle information and environment information of the vehicle.

Optionally, the vehicle information includes: identifier information of the vehicle, location information of the vehicle, driving status information, and number information of passengers in the vehicle; and the environment information of the vehicle includes at least one of the following: weather information and obstacle information.

Optionally, the apparatus further includes:

an output module, configured to present an input port for the number information of the passengers, and receive the number information of the passengers in the vehicle, which is inputted by a passenger through the input port for the number information of the passengers, where the input port for the number information of the passengers is an input interface for the number information of the passengers or a voice input port for the number information of the passengers.

Optionally, the instruction for simulating a driving operation includes one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

The apparatus provided in this embodiment can be configured to perform the method in Embodiment 2. The specific implementation and technical effects are similar, and details are not repeated here.

Figure 6:
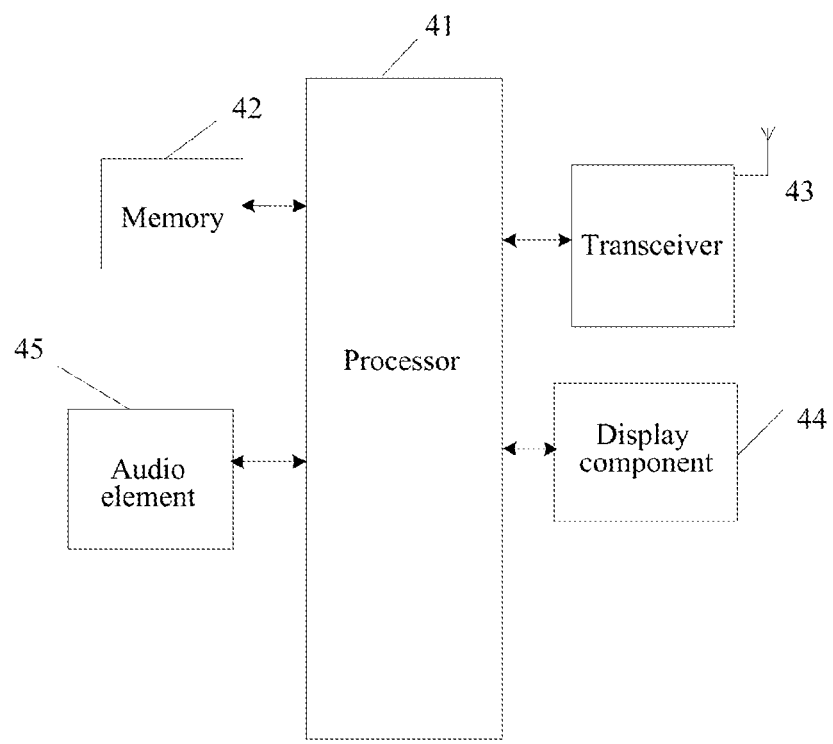
FIG. 6 is a schematic structural diagram of a central control device provided in Embodiment 5 of the present disclosure.

FIG. 6 is a schematic structural diagram of a central control device provided in Embodiment 5 of the present disclosure. As shown in FIG. 6, the central control device according to this embodiment includes: a processor 41, a memory 42 and a transceiver 43, where the memory 42 and the transceiver 43 connect to and communicate with the processor 41 through a bus, the memory 42 is configured to store instructions, the transceiver 43 is configured to communicate with other devices, and the processor 41 is configured to execute the instructions stored in the memory 42 to cause the central control device to perform the method as described in Embodiment 1, which will not be repeated here.

Where the processor 41 may be a microcontroller unit (Microcontroller Unit, MCU for short), where the MCU is also referred to as a single chip microcomputer (Single Chip Microcomputer) or a single chip microcomputer. The processor 41 may also be a central processor (Central Process Unit, CPU for short), a digital signal processor (digital signal processor, DSP for short), application specific integrated circuit (application specific integrated circuit, ASIC for short), a field programmable gate array (field programmable gate array, FPGA for short) or other programmable logic elements, discrete gates or transistor logic elements.

The memory 42 can be implemented by any type of volatile storage device or non-volatile storage device or a combination thereof, such as a static random-access memory (Static Random-Access Memory, SRAM for short), an electrically erasable programmable read only memory (Electrically Erasable Programmable read only memory, EEPROM for short), an erasable programmable read only memory (Erasable Programmable Read Only Memory, EPROM for short), a programmable read-only memory (Programmable Read-Only Memory, PROM for short), a read-only memory (Read-Only Memory, ROM for short), a magnetic memory, a flash memory, a magnetic disk or an optical disk.

The transceiver 43 can establish with other devices a wired or wireless communication link, such as WiFi, 2G, 3G, 4G, or 5G links, or a combination thereof.

The bus may be an industry standard architecture (Industry Standard Architecture, ISA) bus, a peripheral device interconnection (Peripheral Component, PCI) bus, or an extended industry standard architecture (Extended Industry Standard Architecture, EISA) bus, etc. The bus can be divided into an address bus, a data bus, a control bus, etc. For ease of representation, the bus in the drawings of the present disclosure is not limited to only one bus or one type of bus.

Optionally, the central control device further includes a display component 44 and/or an audio element 45.

The display component 44 is configured to display data, such as text, images, and videos, and the display component 44 may be a light emitting diode (Light Emitting Diode, LED for short).

The audio element 45 may include an audio input and an audio output device, such as a microphone and a speaker, and optionally, may further include an audio codec device or an audio enhancement device. The audio element 45 can collect a voice signal inputted by a user and play the voice signal.

FIG. 6 only shows some components related to the present disclosure, but the central control device may further include more components, which is not limited in the present disclosure.

Figure 7:
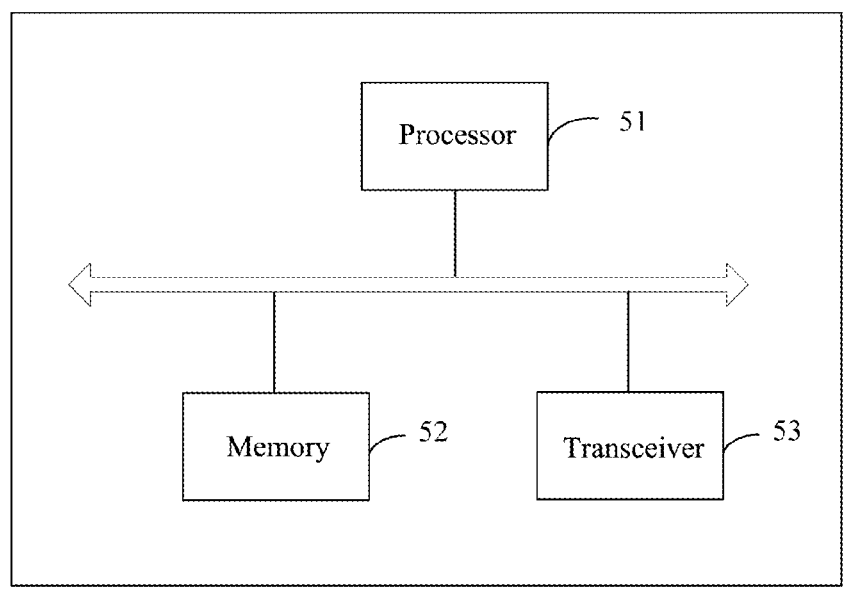
FIG. 7 is a schematic structural diagram of an on board device provided in Embodiment 6 of the present disclosure.

FIG. 7 is a schematic structural diagram of an on board device provided in Embodiment 6 of the present disclosure. As shown in FIG. 7, the on board device provided in this embodiment includes: a processor 51, a memory 52 and a transceiver 53, where the memory 52 and the transceiver 53 connect to and communicate with the processor 51 through a bus, the memory 52 is configured to store instructions, the transceiver 53 is configured to communicate with other devices, and the processor 51 is configured to execute the instructions stored in the memory 52 to cause the on board device to perform the method as described in the Embodiment 2, which will not be repeated here.

Embodiment 7 of the present disclosure provides a computer-readable storage medium, where computer-readable storage medium stores instructions, and the instructions, when executed, cause a computer to perform the method as described in Embodiment 1.

Embodiment 8 of the present disclosure provides a computer-readable storage medium, where computer-readable storage medium stores instructions, and the instructions, when executed, cause a computer to perform the method as described in Embodiment 2.

What is claimed is:

1. A remote control method for an autonomous vehicle, wherein the method is applied to a central control device, the central control device is connected with a simulated cockpit, the simulated cockpit comprises an operating component provided according to a real vehicle structure, and the method comprises:
   receiving a remote control request message sent by a vehicle when status information of the vehicle meets a preset condition, the remote control request message being used to request remote control of the vehicle; wherein the vehicle is connected to a control server, the control server being configured to control the vehicle to drive normally; wherein the preset condition comprises at least one of the following conditions after the vehicle sends a remote control request message to the control server: the vehicle fails to receive a remote control message sent by the control server within a preset time; a message sent by the control server is received within a preset time but the message indicates that the control server cannot control the vehicle; and a remote control message sent by the control server is received within a preset time and the vehicle has operated according to control instructions indicated in the remote control message, but there is still no effect;
   detecting a driving operation of a control person on the simulated cockpit;
   generating an instruction for simulating a driving operation according to the driving operation of a control person on the simulated cockpit, the instruction for simulating a driving operation being used to simulate the driving operation of the control person on the simulated cockpit; and
   sending a remote control message to the vehicle, the remote control message comprising the instruction for simulating a driving operation.

2. The method according to claim 1, wherein the remote control request message comprises vehicle information and environment information of the vehicle, and before detecting the driving operation of the control person on the simulated cockpit, the method further comprises:
   outputting the vehicle information and the environment information of the vehicle.

3. The method according to claim 2, wherein the outputting the vehicle information and the environment information of the vehicle comprises:
   displaying the vehicle information and the environment information of the vehicle.

4. The method according to claim 2, wherein the vehicle information comprises: identifier information of the vehicle, location information of the vehicle, driving status information, and number information of passengers in the vehicle; and
   the environment information of the vehicle comprises at least one of the following: weather information and obstacle information.

5. The method according claim 1, wherein the instruction for simulating a driving operation comprises one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

6. A remote control method for an autonomous vehicle, comprising:

sending a remote control request message to a central control device when status information of a vehicle meets a preset condition, the remote control request message being used to request remote control of the vehicle; wherein the vehicle is connected to a control server, the control server being configured to control the vehicle to drive normally; wherein the preset condition comprises at least one of the following conditions after the vehicle sends a remote control request message to the control server: the vehicle fails to receive a remote control message sent by the control server within a preset time; a message sent by the control server is received within a preset time but the message indicates that the control server cannot control the vehicle; and a remote control message sent by the control server is received within a preset time and the vehicle has operated according to control instructions indicated in the remote control message, but there is still no effect;

receiving a remote control message sent by the central control device, the remote control message comprising an instruction for simulating a driving operation, the instruction for simulating a driving operation being generated by the central control device according to a driving operation of a control person on a simulated cockpit, and the instruction for simulating a driving operation being used to simulate the driving operation of the control person on the simulated cockpit; and controlling an operation of the vehicle according to the instruction for simulating a driving operation.

7. The method according to claim 6, wherein the remote control request message comprises vehicle information and environment information of the vehicle.

8. The method according to claim 7, wherein the vehicle information comprises: identifier information of the vehicle, location information of the vehicle, driving status information, and number information of passengers in the vehicle; and the environment information of the vehicle comprises at least one of the following: weather information and obstacle information.

9. The method according to claim 8, wherein before sending the remote control request message to the central control device, the method further comprises:

presenting an input port for the number information of the passengers, and receiving the number information of the passengers in the vehicle, which is inputted by a passenger through the input port for the number information of the passengers, the input port for the information of the number of passengers being an input interface for the number information of the passengers or a voice input port for the number information of the passengers.

10. The method according to claim 6, wherein the instruction for simulating a driving operation comprises one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

11. A remote control apparatus for an autonomous vehicle, wherein the apparatus is applied to a central control device, the central control device is connected with a simulated cockpit, the simulated cockpit comprises operating components provided according to a real vehicle structure, and the apparatus comprises:

a processor, a memory and a transceiver, wherein the memory is configured to store instructions, the transceiver is configured to communicate with other devices, and the processor is configured to execute the instructions stored in the memory to cause the processor to:

receive, through the transceiver, a remote control request message sent by a vehicle when status information of the vehicle meets a preset condition, wherein the remote control request message is configured to request remote control of the vehicle; wherein the vehicle is connected to a control server, the control server being configured to control the vehicle to drive normally; wherein the preset condition comprises at least one of the following conditions after the vehicle sends a remote control request message to the control server: the vehicle fails to receive a remote control message sent by the control server within a preset time; a message sent by the control server is received within a preset time but the message indicates that the control server cannot control the vehicle; and a remote control message sent by the control server is received within a preset time and the vehicle has operated according to control instructions indicated in the remote control message, but there is still no effect;

detect a driving operation of a control person on the simulated cockpit;

generate an instruction for simulating a driving operation according to the driving operation of a control person on the simulated cockpit, simulating a driving operation wherein the instruction for simulating a driving operation is configured to simulate the driving operation of the control person on the simulated cockpit; and send, through the transceiver, a remote control message to the vehicle, wherein the remote control message comprises the instruction for simulating a driving operation.

12. The apparatus according to claim 11, wherein the remote control request message comprises vehicle information and environment information of the vehicle, and the processor is further configured to execute the instructions stored in the memory to cause the processor to:

output the vehicle information and the environment information of the vehicle.

13. The apparatus according to claim 12, wherein the processor is configured to execute the instructions stored in the memory to further cause the processor to:

display the vehicle information and the environment information of the vehicle.

14. The apparatus according to claim 12, wherein the vehicle information comprises: identifier information of the vehicle, location information of the vehicle, driving status information, and number information of passengers in the vehicle; and the environment information of the vehicle comprises at least one of the following: weather information and obstacle information.

15. The apparatus according to claim 11, wherein the instruction for simulating a driving operation comprises one or more of the following instructions: an instruction for rotating a steering wheel, an instruction for turning a wiper switch, an instruction for turning an ignition switch, an instruction for rotating a headlight switch, an instruction for stepping on an accelerator pedal, an instruction for stepping on a clutch pedal, an instruction for stepping on a brake pedal, an instruction for pulling up a handbrake and an instruction for pressing a hazard indicator warning light.

\* \* \* \* \*